United States Patent
Shestak

(10) Patent No.: US 7,646,537 B2
(45) Date of Patent: Jan. 12, 2010

(54) HIGH-RESOLUTION FIELD SEQUENTIAL AUTOSTEREOSCOPIC DISPLAY

(75) Inventor: Sergey Shestak, Suwon-si (KR)

(73) Assignee: Samsung Electronics Co., Ltd,, Suwon-si (KR)

( * ) Notice: Subject to any disclaimer, the term of this patent is extended or adjusted under 35 U.S.C. 154(b) by 277 days.

(21) Appl. No.: 11/648,669

(22) Filed: Jan. 3, 2007

(65) Prior Publication Data
US 2007/0153380 A1     Jul. 5, 2007

(30) Foreign Application Priority Data
Jan. 3, 2006     (KR) .................. 10-2006-0000506

(51) Int. Cl.
G02B 27/26     (2006.01)
G02B 27/22     (2006.01)

(52) U.S. Cl. ................... 359/465; 359/463; 348/57; 348/59

(58) Field of Classification Search ............... None
See application file for complete search history.

(56) References Cited

U.S. PATENT DOCUMENTS

| 5,572,341 | A | * | 11/1996 | Fergason | 349/200 |
| 2001/0005284 | A1 | | 6/2001 | Lee et al. | |
| 2005/0030301 | A1 | | 2/2005 | Harrold et al. | |
| 2005/0111100 | A1 | * | 5/2005 | Mather et al. | 359/464 |
| 2005/0168816 | A1 | * | 8/2005 | Fukaishi et al. | 359/465 |
| 2006/0139751 | A1 | * | 6/2006 | Cha et al. | 359/465 |
| 2007/0008406 | A1 | * | 1/2007 | Shestak et al. | 348/58 |
| 2007/0258140 | A1 | * | 11/2007 | Shestak et al. | 359/465 |
| 2008/0036853 | A1 | * | 2/2008 | Shestak et al. | 348/51 |

FOREIGN PATENT DOCUMENTS

| EP | 1 067 805 A2 | 7/2000 |
| JP | 8-186849 A | 7/1996 |
| JP | 09-159971 A | 6/1997 |
| JP | 2002-148561 A | 5/2002 |
| KR | 2003-0075001 A | 9/2003 |

* cited by examiner

Primary Examiner—Lee Fineman
(74) Attorney, Agent, or Firm—Sughrue Mion, PLLC

(57) ABSTRACT

Provided is a high-resolution field sequential autostereoscopic display. The display includes a display panel including display elements which display images, a lenticular array receiving a signal from the display panel and outputting a directional signal to be viewed with both eyes of a viewer, an anisotropic element arranged parallel to the lenticular array and outputting from the lenticular array a phase-alternated signal, a polarization switch switching the output phase of the anisotropic element according to an image refresh rate of the display panel, and a polarizer outputting a signal with a predetermined phase among phases of an output signal of the polarization switch. The autostereoscopic display provides full resolution stereoscopic images viewable without eyeglasses. Conventional low cost TN LCD panels can be applied to the autostereoscopic display without significant increase of flickering or crosstalk between the left and right images.

11 Claims, 10 Drawing Sheets

HIGH-RESOLUTION FIELD SEQUENTIAL AUTOSTEREOSCOPIC DISPLAY

CROSS REFERENCE TO RELATED APPLICATIONS

This application claims the priority of Korean Patent Application No. 10-2006-0000506, filed on Jan. 3, 2006, in the Korean Intellectual Property Office, the disclosure of which is incorporated herein in its entirety by reference.

BACKGROUND OF THE INVENTION

1. Field of the Invention

The present invention relates to autostereoscopic displays, made mostly in the form of flat panels for use in televisions.

2. Description of the Related Art

Image resolution is one of the most important characteristics in electronic imaging. However, when conventional methods of autostereoscopic imaging is applied to flat panel displays, the horizontal resolution suffers.

Conventional methods employ parallax barrier or lenticular lenses or an array of light stripes as in the backlight of a liquid crystal display (LCD) panel to separate viewing zones of the left and right images of a stereo-pair, thus providing selective viewing of the left and right images by the right and left eyes of a viewer.

Conventionally, two images of a stereo-pair are displayed on the same image panel but on different sets of columns, for instance, a left image on the odd columns and a right image on the even columns. Since both left and right images are displayed in the same panel, resolution of each image is less than half the overall panel resolution.

There are two different ways to achieve the same resolution of stereoscopic images as the original resolution of the panel. One of the methods comprises sequentially displaying full resolution left and right images. Practical embodiments of the method are disclosed in U.S. Pat. Nos. 5,465,175 and 6,014,164, FIG. 33 of U.S. Pat. No. 6,069,650, and Japanese Patent No. 2001-66547. Since each eye of the viewer periodically sees just a black screen, this method requires a very fast panel speed. That is, a low frame-rate of the imaging panel causes image flickering. In order to avoid flickering, the panel refresh rate should be about 100-120 Hz or higher. The fact that the same set of pixels of the display panel in one frame displays the left image and in the next frame displays the right image also requires a very fast panel response time. A fast response time leads to high crosstalk, i.e., right eye sees the left image and vice versa. In order to reduce crosstalk between left and right images, the image persistence should be significantly smaller than the frame period. The residual crosstalk may noticeably deteriorate perception of stereoscopic images. Since current LCD technology based on twist nematic (TN) liquid crystal does not provide short persistence, and U.S. Pat. No. 6,069,650 recommended the use of a panel based on ferro-electric liquid crystal (FLC). However, large size FLC panels are not currently in production, because of their high manufacturing cost.

Another method of displaying high resolution stereoscopic images disclosed in FIG. 8 of U.S. Pat. No. 5,606,455, U.S. Pat. No. 4,457,574, and Japanese Patent No. 2004-325494 entails sequentially displaying complimentary pairs of interlaced images with lower resolution. Two interlaced images at half of the full resolution, displayed in a sequence are perceived as a high-resolution image because of the persistence of human vision. For instance, odd columns of the left or right image can be displayed in sequence with the corresponding even columns, thus being perceived as a high resolution image. This method of displaying stereoscopic images is less sensitive to the panel's frame-rate because both left and right eyes see an image on the screen at any point in time. Interlaced images are satisfactorily viewable even with 60 Hz and 50 Hz field frequency like in national television systems committee (NTSC) and phase alternation line (PAL) television systems, respectively.

To display odd and even columns sequentially in the conventional autostereoscopic displays, left and right images should be addressed to the same set of the LCD panel. For example, to display odd columns of the left image, the left image is addressed to the odd columns of the display panel, but in the next period, to display even columns of the left image on the panel, columns are switched so that the same odd columns of the panel display the right image. However, because of the finite response time of the panel, left and right images in the odd columns cannot be exchanged immediately, which results in seeing the right images by the left eye and vice versa. This unwanted phenomenon usually called "crosstalk" noticeably deteriorates the quality of stereoscopic images.

Yet another drawback associated with the current field sequential autostereoscopic technology is the fact that graphic data used by an LCD panel is not refreshed instantly on the entire panel. It is refreshed line-by-line, which is an additional source of crosstalk if the backlight operates in a continuous wave (CW) mode, as it conventionally does.

The insufficient speed of the panel does not deteriorate the image quality as much as in the first case. That is, the insufficient speed of the panel reduces the contrast of fine details, but does not cause crosstalk between left and right images.

Recent development of fast response LCD panels has led to new opportunities for displaying stereoscopic images with full panel resolution by time multiplexing two image fields with lower resolution. To provide frame-sequential displaying, the means to produce selective viewing should be switchable between at least two states. For instance, U.S. Pat. No. 5,457,574 discloses a field sequential autostereoscopic display with switchable backlight. In the disclosed technique, a 3D display includes a directional backlight, a rear lenticular plate and a liquid crystal panel which is capable of refreshing graphic information with a refresh rate at least twice as high as is necessary for a flicker-less viewing, for example, 60-120 Hz. The backlight includes at least two separated light sources or a single light source with switchable diaphragm arranged so that the effective horizontal position of the light source can be switched synchronously by graphic data refreshing. Since the position of the viewing zone is determined by the position of the light source, each eye of the viewer can sequentially perceive the images displayed with different sets of pixels, thus seeing full resolution images. The above technique offers a solution to the problem of the displays based on the directional backlight, which is usually larger in size and more complex in manufacturing than the conventional diffuse backlight. An example of the solution using diffuse backlight is disclosed in Japanese Patent No. 2004-325494. The disclosed solution employs a flat panel, a front parallax barrier (PB) and a light deflector, placed between a viewer and the PB. The deflector periodically shifts the visual position of the display panel with PB, thus doubling the available resolution of the display in 3D mode. The disadvantage of this solution is the high cost of the wide opening deflector and significant light losses in the PB.

Another example of the solution employing diffuse backlight is disclosed in FIG. 33 of U.S. Pat. No. 6,069,650. The disclosed solution employs a switchable directional light source, which is used as a backlight for a fast LCD panel. The directional light source is composed of a diffuse backlight, an electrically addressable spatial light modulator (SLM) and a lenticular lens array.

Since left and right images in the disclosed display are displayed in a frame-sequential manner, each eye receives the sequence, which alternates between a black screen and a corresponding left or right image. To avoid flicker, the frame-rate of the display panel should be at least 100-120 Hz. Another problem with the aforementioned solution is that conventional thin film transistor (TFT) LCD panels cannot be directly applied to the display with the disclosed formation for the following reasons. A TFT LCD panel is controlled so that the left and right images sequentially inputted into the display are not actually displayed in a sequence. Images on the LCD screen are refreshed line-by-line during almost an entire frame period so that two different parts of successive images are mostly displayed on the screen at the same moment, sharing the screen as shown in FIG. 33 of U.S. Pat. No. 6,069,656. For example, an upper part of the screen displays the left image while a lower part of the screen displays the right image. FIG. 33 shows the status of the LCD panel sampled in different moments of the refresh period T. The described data refresh method could lead to severe crosstalk if the SLM switch instantly switches the polarization of the entire directional backlight. Another problem is the finite speed of the SLM switching, which also leads to crosstalk. Another source of the crosstalk is the finite switching speed of the imaging cells of the LCD panel. Since the last two kinds of crosstalk appear due to insufficient speed of switching processes, they are called dynamic crosstalk. To solve the above problems, the aforementioned display is based on an FLC type imaging panel and an FLC type SLM as the fastest LCD devices. However, FLC flat panels are currently not in production, because of their high manufacturing cost. Also, the cost of large size polarization switch based on FLC technology is too high. On the other hand, recent improvements in fast LCD panels based on TN type liquid crystal has led to new opportunities in time sequential autostereoscopic displays. It is desirable to find a way to use inexpensive imaging and switching liquid crystal panels in high-resolution autostereoscopic display. These panels are based on the use of conventional liquid crystal materials which have a switching time comparable with the frame period of LCD panel.

FIG. 1 is a simplified illustration of the technique, disclosed in FIG. 8 of U.S. Pat. No. 5,606,455. It is assumed that the backlight unit, which is not shown in the drawing, alternatively produces two sets of secondary light sources shaped as bright vertical odd lines and even lines disposed in the plane 12 and can be switched from odd lines to even lines and vice versa in synchronization with the refreshing of the LCD panel. Each line works as a lambertian light source. An LCD panel 11 is placed at a predetermined distance from the light sources to provide stereoscopic viewing zones from the viewing plane 13.

In a certain period, the LCD panel 11 displays odd columns of the left and right images registered alternatively, denoted by the letters R and L in FIG. 1A. The LCD cells modulate the light coming from odd light sources (even lines are "off") so that the right eye of a viewer receives only the light passed through the right image columns and the left eye receives only the light passed through the left image columns, thus producing a stereoscopic sensation. In a next period (see FIG. 1B), the columns, which formerly displayed the right image, are activated to display the left image and vice versa. This new graphic data represents even columns of the left and right half-resolution images. The light source is also switched so that the even lines are on and odd lines are "off". A viewer sees the light from even lines, modulated by the left and right columns and the position of the lines is interlaced with their position from the previous frame. Due to the persistence of human vision, odd and even half-resolution fields, shown sequentially, are perceived as one full-resolution stereoscopic image Because of the finite response time of the TN LCD panel, left and right images in the columns cannot be exchanged immediately, resulting in seeing the right images by the left eye, and vise versa. This unwanted phenomenon called crosstalk noticeably deteriorates the quality of stereoscopic images.

Yet another drawback associated with the aforementioned technique is the fact that graphic data on an LCD panel is not refreshed instantly on the entire panel. It is refreshed line-by-line, which is an additional source of crosstalk if the backlight operates in a CW mode, as it conventionally does.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an inexpensive solution for a high-resolution autostereoscopic display which can reduce flicker, crosstalk between the left and right images caused by insufficient response time of a panel, and crosstalk caused by line-by-line refreshing of graphic data on an LCD panel.

According to an aspect of the present invention, there is provided a high-resolution field sequential autostereoscopic display including: a display panel including display elements which display images; a lenticular array receiving a signal from the display panel and outputting a directional signal for both eyes of a viewer; an anisotropic element arranged parallel to the lenticular array and outputting from the lenticular array a phase-alternated signal; a polarization switch switching the output phase of the anisotropic element according to an image refresh rate of the display panel; and a polarizer outputting a signal with a predetermined phase among phases of an output signal of the polarization switch.

The fast response display panel may include an LCD display panel equipped with a backlight unit and a first polarizer passing a beam with a predetermined phase from among beams output from the LCD display panel, wherein the polarizer corresponds to a second polarizer.

The first and second polarizers may be parallel or cross perpendicular to each other.

The anisotropic element may include a microretarder plate.

The microretarder plate may include stripe regions of an equal width and with alternating half-wave retardance and zero retardance, and the polarization switch may invert an output phase of the microretarder plate.

The lenticular array may be arranged parallel to lines of the display elements of the display panel and include lenticular lenses covering two display elements in one line for each lenticular array.

The width of the stripe regions of the microretarder plate may correspond to half the width of the lenticular lenses.

The display may further include a display controller providing an image signal to the display panel.

The display may further include a polarization switch controller controlling switching of the polarization switch.

The polarization switch controller may switch the polarization switch at half the display refresh rate provided by the display controller.

BRIEF DESCRIPTION OF THE DRAWINGS

The above and/or other aspects and features of the present invention will become more apparent by describing in detail certain exemplary embodiments thereof with reference to the attached drawings in which:

FIG. 1A illustrates an initial period of display and FIG. 1B illustrates a period following the initial period depicted in FIG. 1A;

DETAILED DESCRIPTION OF THE INVENTION

Figure 1A:
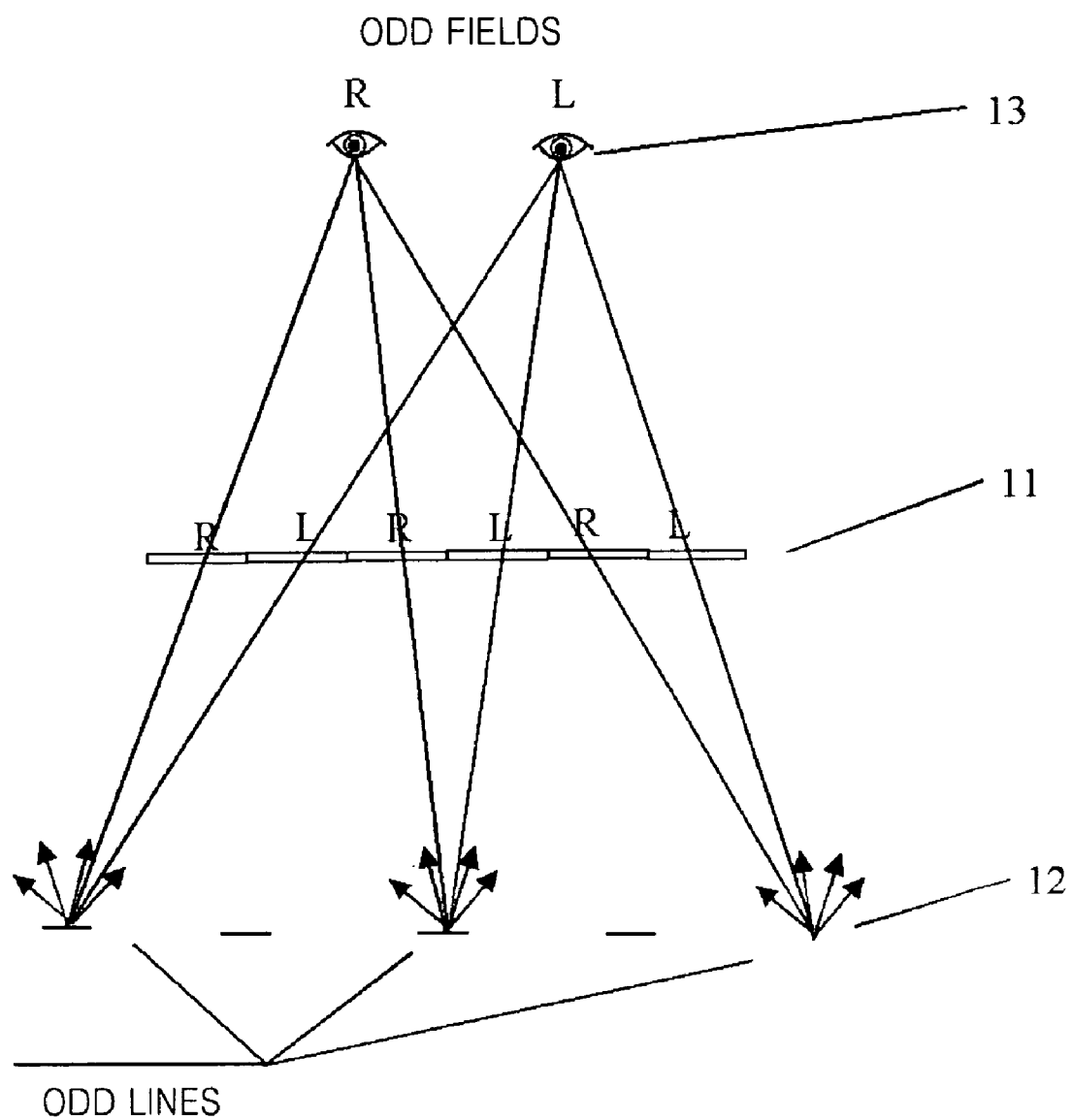
FIGS. 1A and 1B are simplified illustrations of a conventional display method.
Figure 1B:
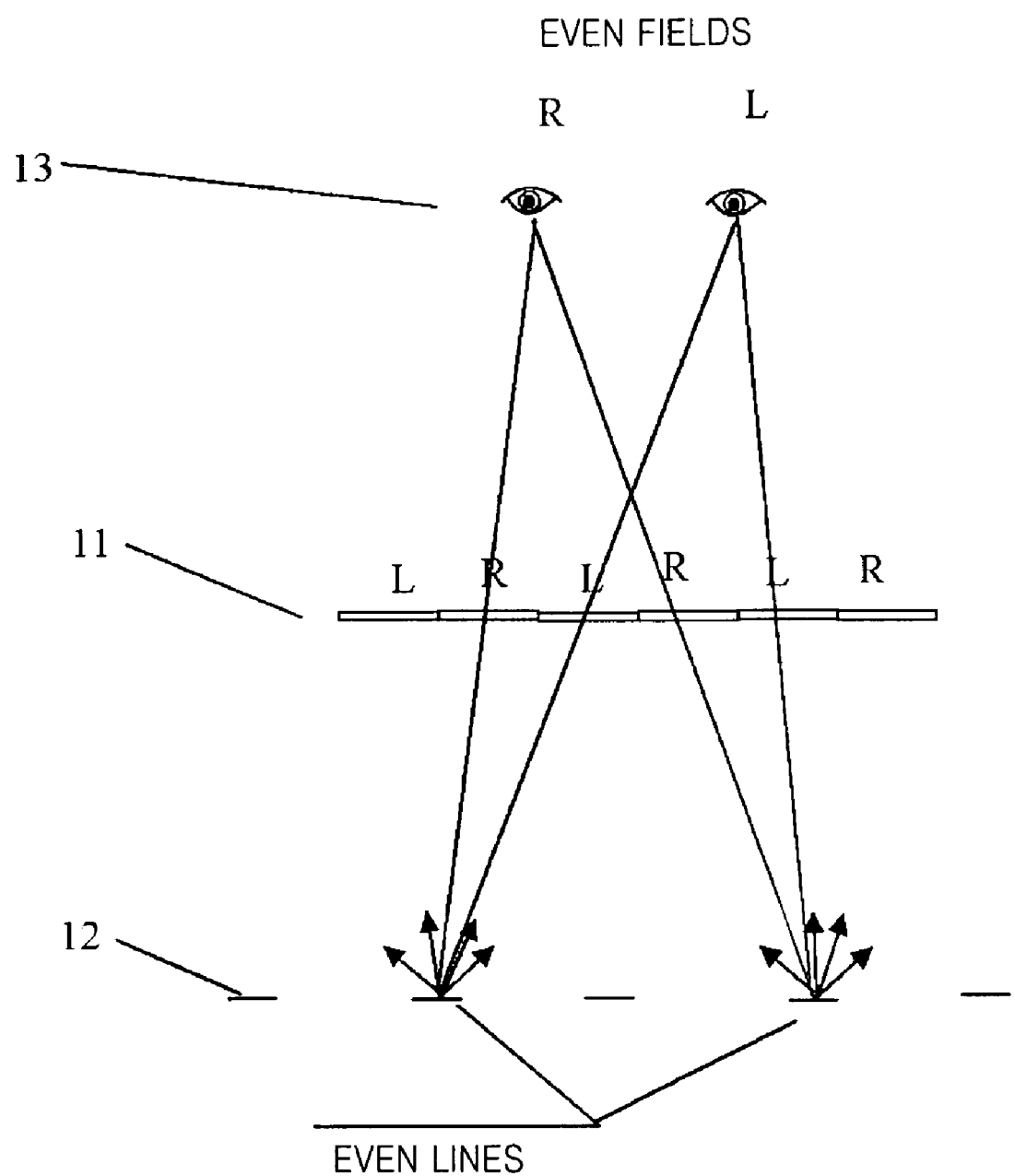

The present invention will now be described more fully with reference to the accompanying drawings, in which exemplary embodiments of the invention are shown. The invention may, however, be embodied in many different forms and should not be construed as being limited to the exemplary embodiments set forth therein; rather, these exemplary embodiments are provided so that the disclosure will be thorough and complete, and will fully convey the concept of the invention to those skilled in the art. Like reference numerals in the drawings denote like elements, and thus their description will not be repeated.

Figure 2:
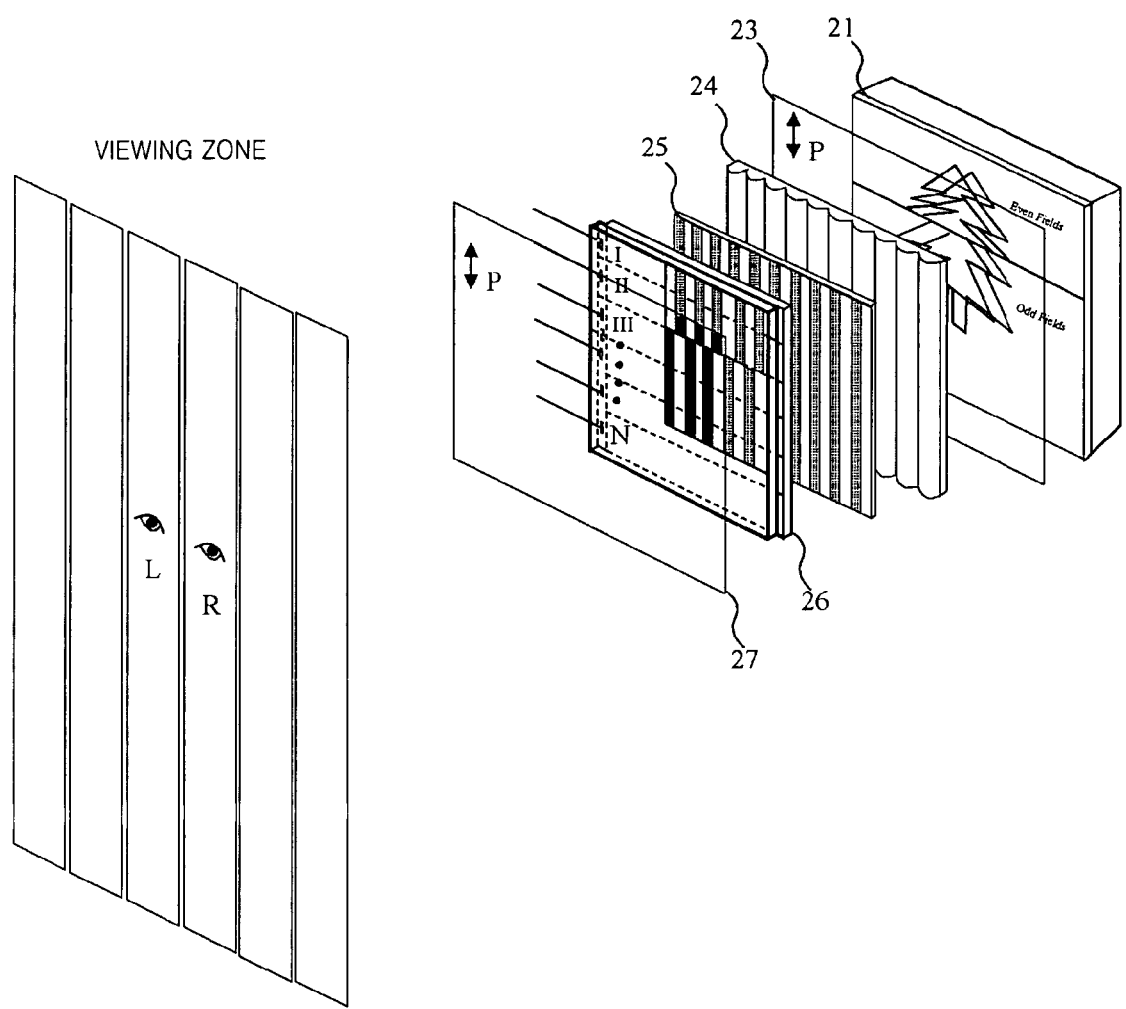
FIG. 2 is an expanded view of an autostereoscopic display according to an exemplary embodiment of the present invention.

FIG. 2 is an expanded view of an autostereoscopic display according to an exemplary embodiment of the present invention. The high resolution autostereoscopic display includes a display panel 21, which may be, for example, an LCD panel, a first polarizer 23, which is shaped like a convex lens and may be an output polarizer of the LCD panel, a lenticular array 24, a linear array of anisotropic elements, such as microretarders 25, a polarization switch 26, and a second polarizer 27.

Figure 3:
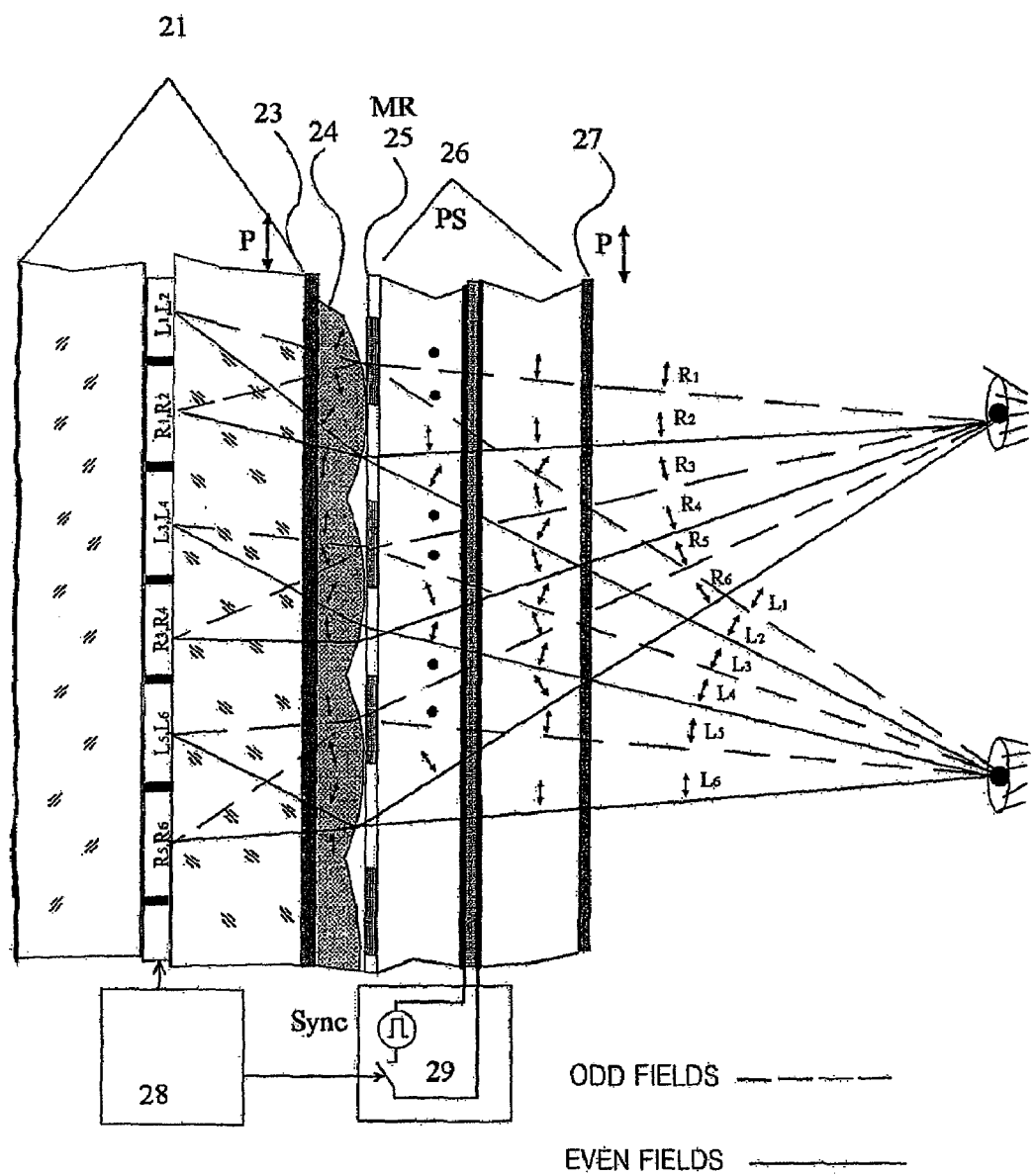
FIG. 3 is a planar view of the autostereoscopic display of FIG. 2.

FIG. 3 is a planar view of the autostereoscopic display of FIG. 2.

The display panel 21 displays images and includes rows and columns of image elements. When the display panel 21 is an LCD panel, a backlight (not shown) is generally attached behind the display panel 21 and illuminates the image elements of the display panel 21. Images displayed on the display panel 21 may be signaled together with a backlight beam. The images are generated by a display controller 28 and displayed on the display panel 21.

The first polarizer 23 is attached to the display panel 21 and passes (polarizes) a beam with a predetermined phase among beams output from the display panel 21. When the display panel 21 is an LCD panel, the first polarizer 23 is generally attached to or part of an output surface of the LCD panel.

The lenticular array 24 is arranged behind the first polarizer 23 and determines a direction of a beam output from the first polarizer 23, that is, a direction in which the left or right eye of a viewer sees. Each lenticular plate includes a plurality of lenticular lenses. In this case, the number of lenticular lenses must be half the number of pixels included in a line of the display panel 21 so that one lenticular lens can cover two pixels arranged parallel to each other on the display panel 21. A pitch radius of each lens and the distance between each lens and display pixels, that is, a focal distance, can be determined by those of ordinary skill in the art.

The linear array of anisotropic elements such as the microretarders 25 are arranged parallel to the lenticular array 24, and the microretarders 25 phase-alternate a beam output from the lenticular array 24, and output the phase-alternated beam.

The second polarization switch 26 inverts the polarization state of a beam output from the microretarders 25. The second polarization switch 26 is switched by a polarization switch controller 29. The polarization switch controller 29 receives synchronization pulses according to a refresh rate of image data from the display controller 28 and changes polarity of polarizations connected thereto at half the refresh frequency, thereby accomplishing polarization switching.

The second polarizer 27 outputs a beam parallel to or crossing perpendicular to the beam output from the first polarizer 23.

The display controller 28, which sends a graphical signal (an image signal) to the display panel 21, is capable of refreshing the graphic data at a high refresh rate, at least twice as high as is necessary to avoid image flickering, for example, 120 Hz, and sends syncro-pulses to the polarization switch controller 29 capable of synchronously switching the polarization switch 26 ON and OFF with a half of the refresh frequency rate. All planar components are attached together in a form of a flat panel as shown in a planar view in FIG. 3, and the columns of display elements, lenticular array and linear array of anisotropic elements are aligned in parallel to each other.

It can be assumed that the first and second polarizers 23 and 27 are arranged parallel to each other and that a selected polarization direction is vertical. The microretarders 25 are formed of birefringent stripes and the width of each birefringent stripe is equal to half the pitch of the lens array 24.

The number N of stripes applied to high resolution images may vary depending on the requirements. In the simplest case, the retardance of the stripes is plus or minus half of the central wavelength (shown as hatched lines in the drawing) and the retardance of other stripes (shown as solid lines in the picture) is zero, i.e. the corresponding areas are isotropic.

For example, when the microretarders 25 composed of five sections and the second polarization switch 26 are used, crosstalk can be reduced down to 11%. The stripe sections are aligned parallel to the panel's rows so that each section of the polarization switch controls a corresponding section of the display. The number of the section may vary from 5 through 10 corresponding to the number of sections which are the same as the number of rows in the panel, for example, 1024. It is suggested that rows may be oriented in a horizontal direction as well as in a vertical direction. In order to provide a better contrast in a wider viewing angle, the second polarization switch 27, which usually comprises electrically controllable microretarders 25, should be switched from zero retardance in a first state to the retardance opposite to the retardance of the birefringent stripe.

Figure 4A:
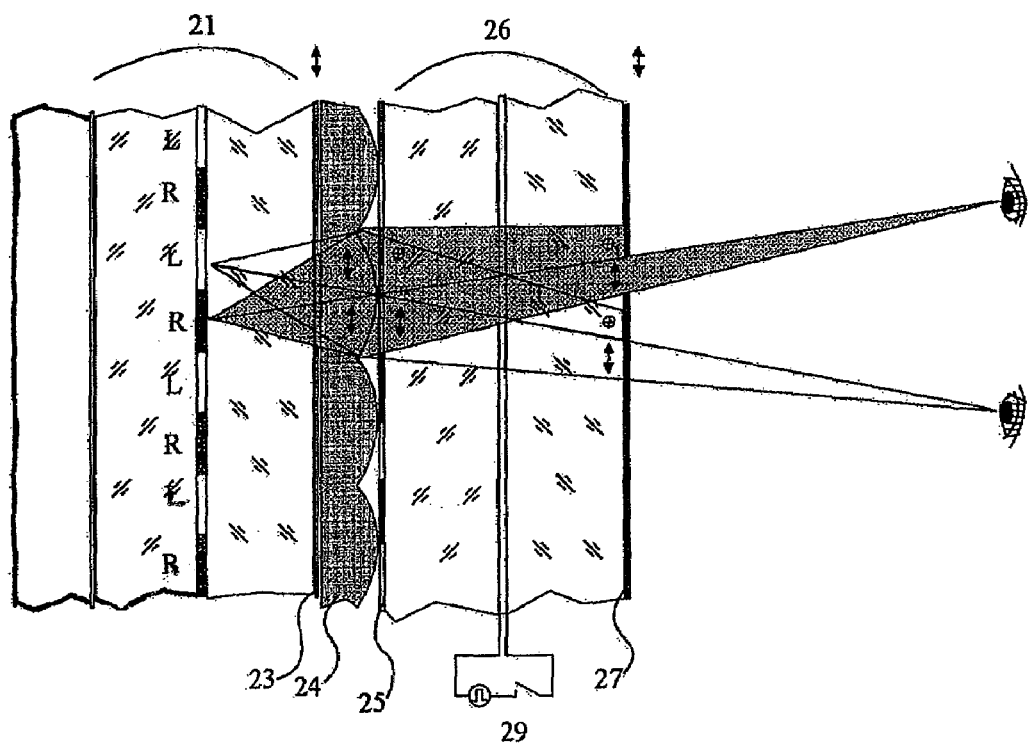
FIGS. 4A and 4B illustrate a display operation of the autostereoscopic display of FIG. 2 according to each switch state of the polarization switch.
Figure 4B:
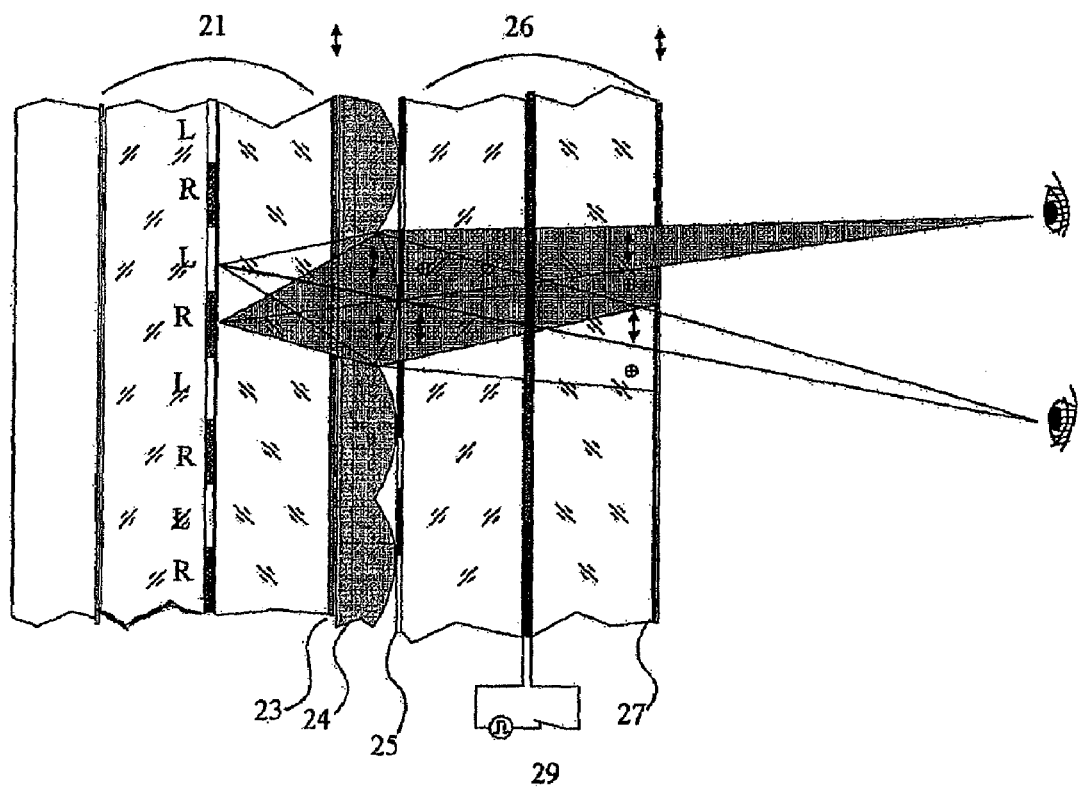

FIGS. 4A and 4B illustrate a display operation of the autostereoscopic display according to each switch state of the polarization switch.

Figure 5A:
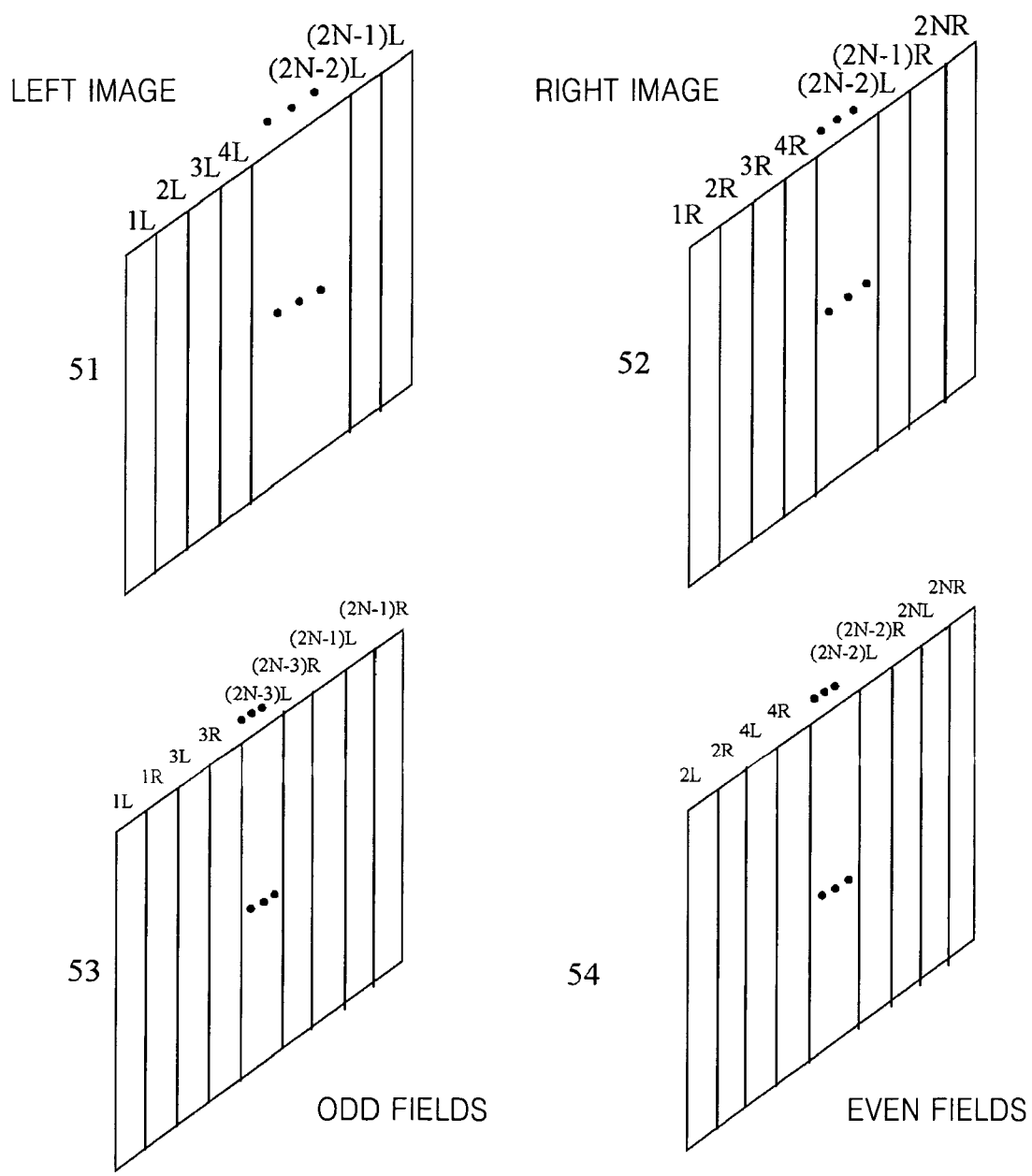
FIG. 5A illustrates the arrangement of graphic data for displaying 3D images.

Referring to FIG. 4A, in a certain moment of time, a section of a polarization switch (PS) is off and the image is displayed in the display panel in the form of alternating columns of pixels belonging to the right and left images of a stereo-pair as indicated by reference numeral 53 in FIG. 5A. Each pixel of the LCD display panel 21 emits polarized light with vertical polarization. Since all right parts (upper parts in FIG. 4A) of the lenticular lenses 24 are covered with the half-wave microretarders 25, a vertically polarized light beam, passed through the right part of the lens changes its polarization to horizontal and is blocked by the second polarizer 27. It means that the right part of each lens is visible to the viewer as just a dark vertical line as shown in the drawing 55 of FIG. 5B. At the same time, the light passing through the left part of the lenticular lens (lower part in FIG. 4A) passing through the isotropic stripe of the microretarder plate of the left part of the lenticular lens keeps its vertical polarization and is not blocked by the second polarizer 27. Since the light beams from the odd columns displaying the left image and even columns displaying the right image are directed to different points in the viewing zone, the viewer sees the left image with his left eye and the right image with his right eye, thus perceiving a stereoscopic sensation. In the first half of the displaying period, right and left images are displayed at half of the panel resolution with the left half of each lens. In fact, in the first half of the period, just odd columns of the left and right images are displayed.

The described situation lasts within one refresh period of the imaging panel, i.e., during 1/50 to 1/120 of a second, depending on the frame-rate. Operation of the display in the next period is shown schematically in FIG. 4B.

The display controller 28 sends to the display panel 21 the next frame of the stereoscopic image, corresponding to the even columns of high-resolution images. At the same time, the polarization switch controller 29 applies the control voltage to the second polarization switch 26 and the second polarization switch 26 changes the polarization of the input light to orthogonal. Since the first and second polarizers 23 and 27 are parallel to each other, the second polarizer 27 now blocks the light passed through the isotropic regions of the microretarder plate. It results in the left and right eyes of viewer seeing the light passing through the right sides of each lenticular lens, while the light passing through the left sides is blocked. As before, the right and left eyes of the viewer receive the light only from the columns of the display panel 21, displaying left and right images correspondingly, but now, the light is passing only through the right halves of each lens. Thus, in the second part of the period, the viewer also sees half resolution stereoscopic images but these images are displayed by right halves of lenticular lenses, which are shifted to half of the lens pitch with respect to the left halves used in the first part of the period. Since the refresh period is shorter than human eye persistence, two interlaced fields displayed at half full resolution in a sequence are perceived as a full resolution image. Slow response of the TN TFT panels cause the same problem in the autostereoscopic display, as discussed in the displaying of moving pictures, i.e., loss of resolution. The response time of 4 ms and even 3 ms, achieved in mass produced LCD panels, may allow for little loss of resolution. The recent development of LCD panels in terms of moving pictures using black image insertion, blinking backlight control, and an optically compensated bend (OCB) mode in LCD panels will also improve the performance of the display in accordance with current invention.

The arrangement of graphic data for displaying 3D images is shown in FIG. 5A. A stereoscopic image, represented by two full resolution images 51 and 52, whose elements of resolution are arranged in 2N columns, could be taken, for example, with two photo or video cameras, from different (left and right) points of view. These two images also could be designed using a computer with the appropriate graphical software package. The full resolution displayed image should be represented as odd and even fields. Odd fields are a combination of odd columns of the left image alternated with the corresponding odd columns of the right image of the stereo-pair 53, and even fields are a combination of even columns of the left image alternated with corresponding even column of the right image of the stereo pair 54.

Figure 5B:
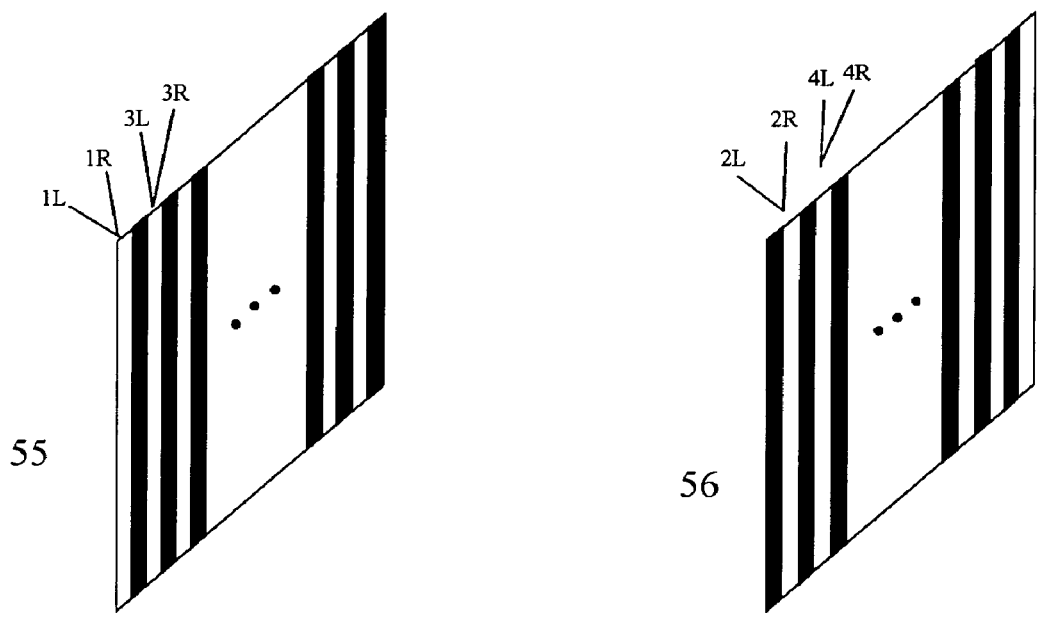
FIG. 5B illustrates a graphic layout of a 3D image on a screen.

FIG. 5B illustrates a graphical layout of a 3D image on a screen.

In the described half of the displaying period, the odd field 53 is displayed and, due to the action of lenticular lenses, the left eye receives the light only from the columns representing the left image and the right eye receives the light only from columns representing the right image of a stereo-pair. Since half of each lens is blocked as described above, a viewer sees the display's screen 55 which has odd black columns, i.e., they do not carry any graphic information. In the next half of the displaying period, a viewer sees even columns of left and right images. Since the field repetition rate is a lot higher than human eye persistence, the interlaced fields displayed at half full resolution in a sequence are perceived as a full resolution image.

Figure 6A:
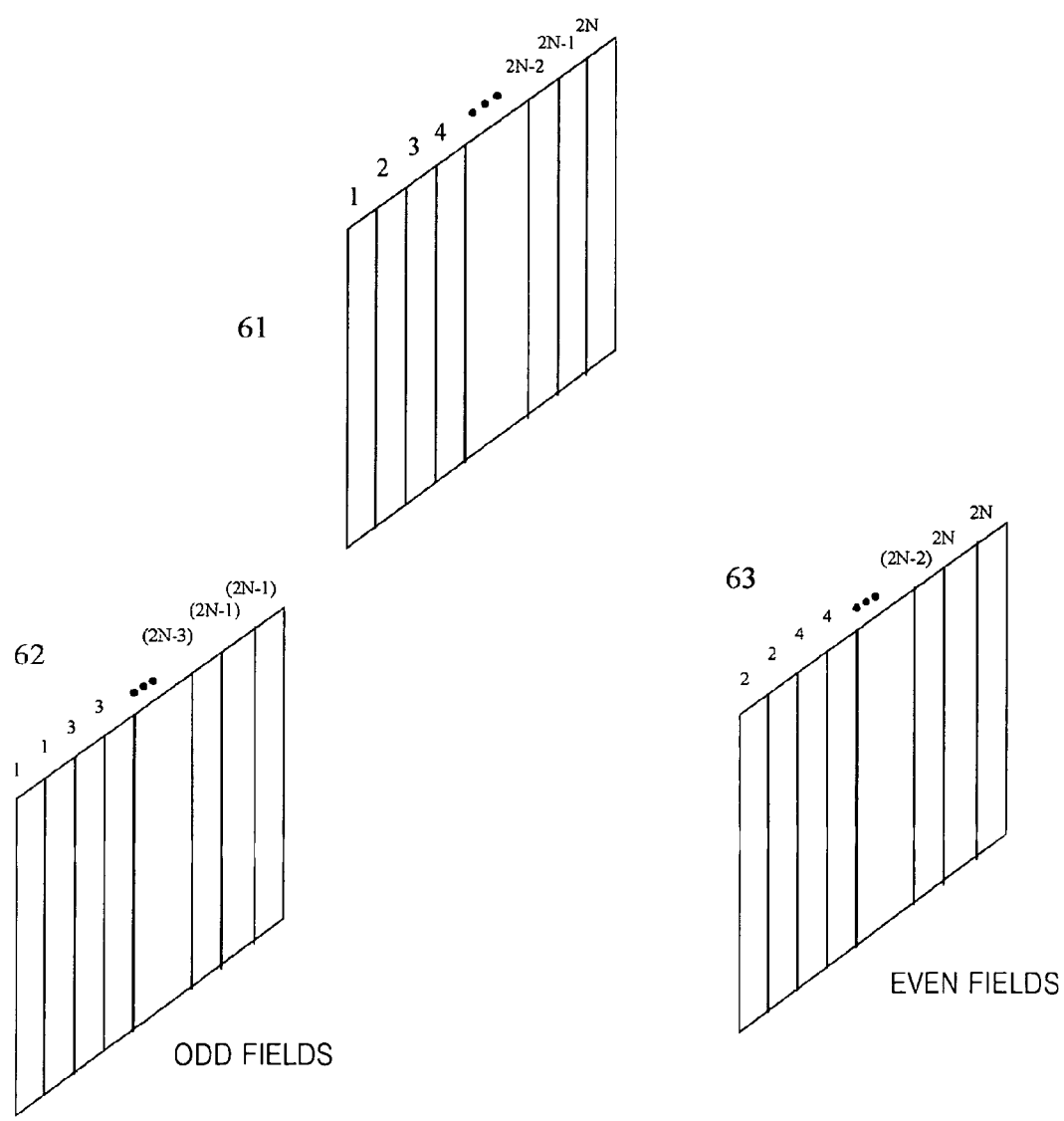
FIG. 6A illustrates the arrangement of graphic data of a 2D image.

The display can be switched to a 2D mode just by changing the arrangement of contents. FIG. 6A illustrates the arrangement of graphic data of a 2D image.

To switch the display to the 2D mode, graphical data should be arranged in the manner, as shown in FIG. 6A, i.e., odd frames 62 with half resolution should be arranged using doubled odd columns of the 2D image 61 and even frames 63 should be arranged using doubled even columns of the 2D image.

Figure 6B:
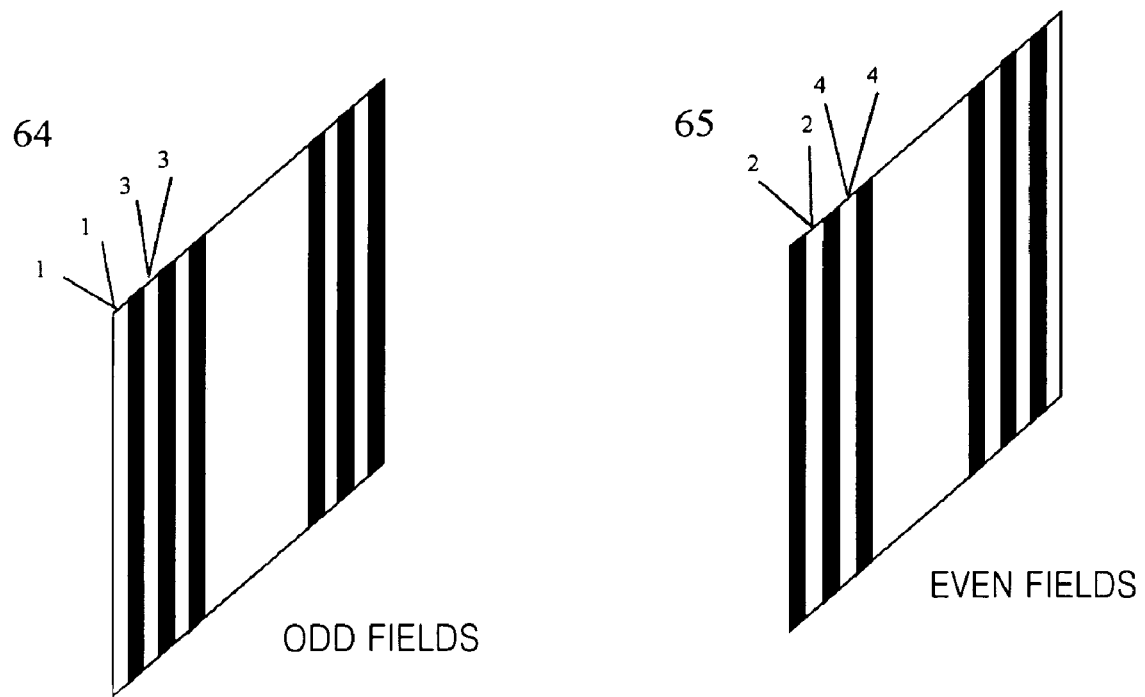
FIG. 6B illustrates a layout of graphic data of a 2D image on a screen.

FIG. 6B illustrates a layout of graphic data of a 2D image on a screen.

In the 2D mode, both left and right eyes of a viewer receive the same graphic data from doubled columns. Since half of each lens is blocked as described above, a viewer sees the display's screen 64 of FIG. 6B which has odd black columns, i.e., they do not carry any graphic information.

Instead of a micropolarizer plate, a patterned polarization rotator with the same shape and positions of vertically elongated regions, capable of rotating the polarization of incident light at 90 degrees altering with isotropic regions may also be employed. The principle of operation of the display with patterned rotator of polarization is analogous to the operation employing the micropolarizer plate described above.

Since the 2D or 3D display operation only depends on graphic data contents, the displayed image may be composed of 2D and 3D parts, thus providing a more natural view of CAD 3D images of medical or scientific 3D graphic data, while retaining normal text. Also, the combination of 2D and 3D graphic images could be useful in medical imaging, computer gaming, advertising and other kinds of computer applications. A moving 3D graphic object may also be composed of a 2D still or moving displayed image.

The autostereoscopic display in accordance with the exemplary embodiments of current invention provide full resolution stereoscopic images viewable without eyeglasses. Conventional low cost TN LCD panels can be applied to the autostereoscopic display without significant increase of flicker or crosstalk between the left and right images.

What is claimed is:

1. A high-resolution field sequential autostereoscopic display comprising:
   a display panel comprising display elements which display images;
   a lenticular array which receives a signal from the display panel and outputs a directional signal for both eyes of a viewer;
   an anisotropic element which receives the directional signal and outputs a phase-alternated signal;
   a polarization switch which switches phase of the phase-altered signal according to an image refresh rate of the display panel; and
   a polarizer which receives an output signal of the polarization switch and outputs a signal with a set phase;
   wherein the anisotropic element comprises a microretarder plate, and
   the microretarder plate comprises stripe regions of an equal width and the microretarder plate has alternating half-wave retardance and zero retardance.

2. The display of claim 1, wherein the anisotropic element is arranged parallel to the lenticular array.

3. The display of claim 1, wherein the display panel is a liquid crystal display (LCD) panel having a fast response time, and the display panel further comprises:
   a backlight unit; and
   a first polarizer which passes a beam with a certain phase from among beams output from the display elements of the LCD panel,
   wherein the polarizer corresponds to a second polarizer.

4. The display of claim 3, wherein the first and second polarizers are parallel or cross perpendicular to each other.

5. The display of claim 1, wherein the polarization switch inverts an output phase of the microretarder plate.

6. The display of claim 1, wherein the lenticular array is arranged parallel to lines of the display elements of the display panel and the lenticular array comprises lenticular lenses which cover two display elements in one line.

7. The display of claim 1, wherein the width of the stripe regions of the microretarder plate corresponds to half width of the lenticular lenses.

8. The display of claim 1, further comprising a display controller which provides an image signal to the display panel.

9. The display of claim 8, wherein a refresh rate of the display controller is at least twice as high as is necessary to avoid image flickering in the display panel.

10. The display of claim 9, further comprising a polarization switch controller which controls switching of the polarization switch.

11. The display of claim 10, wherein the polarization switch controller switches the polarization switch at half the refresh rate provided by the display controller.

* * * * *

UNITED STATES PATENT AND TRADEMARK OFFICE
CERTIFICATE OF CORRECTION

PATENT NO.        : 7,646,537 B2
APPLICATION NO.   : 11/648669
DATED             : January 12, 2010
INVENTOR(S)       : Sergey Shestak It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 286 days.

Signed and Sealed this

Twenty-eighth Day of December, 2010

David J. Kappos
*Director of the United States Patent and Trademark Office*